(12) United States Patent
Dischamp

(10) Patent No.: US 8,689,321 B2
(45) Date of Patent: Apr. 1, 2014

(54) RESTRICTING ACCESS TO THE RESOURCES OF A TERMINAL

(75) Inventor: Paul Dischamp, Levallois Perret (FR)

(73) Assignee: Oberthur Technologies, Colombes (FR)

( * ) Notice: Subject to any disclaimer, the term of this patent is extended or adjusted under 35 U.S.C. 154(b) by 0 days.

(21) Appl. No.: 13/523,590

(22) Filed: Jun. 14, 2012

(65) Prior Publication Data

US 2013/0152192 A1   Jun. 13, 2013

(30) Foreign Application Priority Data

Dec. 12, 2011   (FR) ...................................... 11 61459

(51) Int. Cl.
*H04M 1/66* (2006.01)
*H04M 1/00* (2006.01)
*H04L 9/32* (2006.01)

(52) U.S. Cl.
USPC ....... 726/16; 726/6; 726/7; 455/565; 455/411

(58) Field of Classification Search
USPC .............. 726/7, 16, 2, 4, 17, 28, 30; 455/411, 455/565, 456, 463, 550; 713/183, 186
See application file for complete search history.

(56) References Cited

U.S. PATENT DOCUMENTS

| | | | |
|---|---|---|---|
| 7,398,017 B2 * | 7/2008 | Sorsa ............................ | 396/429 |
| 2008/0020803 A1 * | 1/2008 | Rios et al. ..................... | 455/565 |
| 2009/0311991 A1 | 12/2009 | Shin | |
| 2012/0254981 A1 * | 10/2012 | Levien et al. .................. | 726/16 |

* cited by examiner

*Primary Examiner* — Amare F Tabor
*Assistant Examiner* — Noura Zoubair
(74) *Attorney, Agent, or Firm* — Arent Fox LLP

(57) ABSTRACT

A portable computer terminal having an operating system configured to switch from a first state to a second state in response to a first command from a user and to switch from the second state to the first state in response to a second command from the user, the second command including inputting an identification code of the user, the operating system being capable, in the first state, of causing execution in interactive manner of an application selected from a set of applications, the operating system being capable, in a second state, of causing execution in interactive manner of an application of said set of applications in compliance with an access condition, wherein the access condition is determined as a function of said first command.

1 Claim, 1 Drawing Sheet

RESTRICTING ACCESS TO THE RESOURCES OF A TERMINAL

BACKGROUND OF THE INVENTION

The invention relates to the field of mobile communications terminals. The invention relates in particular to controlling access to applications and to data in a portable computer terminal, e.g. a mobile telephone.

Mobile terminals, such as multifunction telephones or digital tablets, have various communications resources available that make it possible, for example, to access a telephone network, an Internet network, a GPS network, a near field communication (NFC) interface, a Wi-Fi or Bluetooth network, etc.

Those communications resources are associated with software applications for making use of those services. Some of those applications store the user's personal data, such as photographs, messages, connection identification data, banking data, etc. Such data is critical and needs to be made secure.

For this purpose, mobile telephones are protected by a personal code also known as a PIN code. The PIN code serves to verify the identity of the user and also to block certain functions, such as authentication with the telephone network. It is not possible to use the telephone without the PIN code.

In contrast, once the PIN code has been input, the telephone gives access to all of the personal information. However, it can happen that a relative asks the user to lend the telephone in order to make use of a particular resource, for example access to the Internet when the relative's own telephone does not have such Internet access, or when the relative does not have a telephone. Under certain circumstances, a user may lend a telephone to a person outside the family, or may merely desire to hide certain information that is strictly personal (e.g. messages).

With present-day terminals, this is difficult, since by lending a telephone, a user gives access to all of the user's own personal data. Furthermore, if the person borrowing the telephone desires to use an application that requires an identifier or a password, the user must erase his or her own identification data from the input fields in order to allow that person to make a connection. Once the telephone has been returned, the user must once again input his or her own identifiers into the telephone.

In the field of personal computers, it is known to make use of a multi-session operating system, where each session is associated with a user having predefined access rights and personal data. Nevertheless, using a multi-session mechanism increases the size of the operating system and requires access rights to be defined beforehand. Furthermore, changing from one session to another generally involves several complex manipulations. Thus, such a multi-session mechanism is not appropriate for a situation that is of short duration and exceptional, such as lending a telephone.

Document US 2007/0204224 describes a wireless telephone having a memory that is subdivided between a private portion and a public portion. A password must be input in order to gain access to data in the private portion. In that situation, likewise, it is necessary to define beforehand which data is private and which data is public. That solution is therefore relatively inflexible in configuring access rights. Furthermore, the same data can be both private and public, depending on circumstances. The solution proposed by that document is thus likewise not appropriate for a situation that is of short duration and exceptional, such as lending a telephone.

OBJECT AND SUMMARY OF THE INVENTION

The present invention has been made while considering the above-mentioned problems of the prior art.

Thus, the present invention provides a portable computer terminal having an operating system configured to switch from a first state to a second state in response to a first command from a user and to switch from the second state to the first state in response to a second command from the user, the second command including inputting an identification code of the user, the operating system being capable, in the first state, of causing execution in interactive manner of an application selected from a set of applications, the operating system being capable, in a second state, of causing execution in interactive manner of an application of said set of applications in compliance with an access condition, wherein the access condition is determined as a function of said first command.

Correspondingly, the invention also provides a method of operating an operating system of a portable computer terminal, the method comprising:
  in a first state, a step of causing execution in interactive manner of an application selected from a set of applications;
  a step of switching from the first state to a second state in response to a first command from a user;
  in the second state, a step of causing execution in interactive manner of an application of said set of applications in compliance with an access condition; and
  a step of switching from the second state to the first state in response to a second command from the user, the second command including inputting an identification code of the user;
  wherein said access condition is determined as a function of said first command.

The user having the identification code can thus make use of the terminal in the first state and can execute any application. When the user desires to lend the terminal, it is possible to switch it to the second state. In the second state, the person who has borrowed a terminal can access one or more applications, but only in compliance with the access condition. The execution of applications to which the user does not desire to give access is thus protected. Furthermore, since the access condition is determined as a function of the command for switching to the second state, there is no need to define access rights beforehand. On the contrary, the applications to which the user gives access can be selected simply and quickly when switching to the second state. The terminal in accordance with the invention can thus easily be lent without giving access to all of its applications.

The access condition may define a subset of said set of applications that the operating system, while in the second state, may cause to execute in interactive manner.

The first command may comprise a command to display a list of applications, and a command to select at least one application from said list, said subset comprising said at least one selected application.

The first command may comprise a command to execute an application, the execution of the application including transmitting to the operating system a request to change to the second state in response to actuating a predetermined element of the application, said subset comprising said application.

The access condition may define a plurality of times the operating system, while in the second state, may cause applications to be executed in interactive manner.

The identification code comprises a PIN code, a biometric reading, or a touch code.

In an embodiment, in the first state, the application being executed in interactive manner has access to a set of data and, in the second state, the application being executed in interactive manner has access to a subset of the set of data, said subset of the set of data being determined as a function of the first command.

In an embodiment, in the second state, the operating system is suitable for causing an application that does not belong to said subset of said sets of applications to be executed in non-interactive manner.

In an embodiment, the restricted utilization command includes a utilization limit, the operating system, while in the second state, being configured to execute the selected application in interactive manner in compliance with said utilization limit.

In an embodiment, in response to a command to change to standby mode, the operating system is configured to switch from the first state to a locked standby state or from the second state to a non-locked standby state, switching from the locked standby state to the first state requiring input of the user's identification code.

In an implementation, the operating system causes execution in interactive manner of an application selected from: an Internet browser; and a telephone call application.

In an implementation, in the second state, the operating system causes execution in non-interactive manner of an application selected from: an application for which execution implies short-range communication, e.g. of the NFC type; a banking application; and a travel ticket application.

BRIEF DESCRIPTION OF THE DRAWING

Other characteristics and advantages of the present invention appear from the following description given with reference to the accompanying drawing that shows an embodiment having no limiting character. In the figures.

DETAILED DESCRIPTION OF EMBODIMENTS

Figure 1:
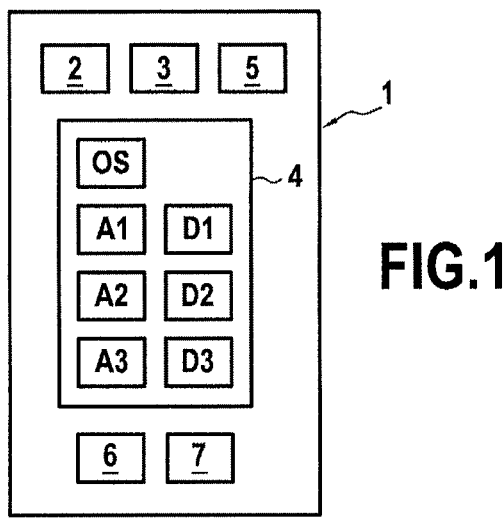
FIG. 1 shows a portable computer terminal in an embodiment of the invention.

FIG. 1 shows a portable computer terminal 1, which may for example be a multifunction telephone or a digital tablet.

The terminal 1 presents the hardware architecture of a computer and comprises in particular: a processor 2; a random access memory (RAM) 3; a non-volatile or read-only memory (ROM) 4; and a user interface 5. The processor 2 enables computer program instructions stored in the ROM 4 to be executed, while making use of the RAM 3. The ROM 4 may comprise a memory medium incorporated in the terminal 1 in non-removable manner and/or in removable manner.

The terminal 1 also includes a plurality of communications interfaces. In FIG. 1, there are shown a communications interface 6 enabling communication over a telephone network and a communications interface 7 enabling communication over a data transfer network. Naturally, the terminal 1 may have more than two communications interfaces, of various types, e.g. short-range communications interfaces (near field communication (NFC), Bluetooth) having a range of a few centimeters to a few tens of centimeters for secure applications involving payment, transport, etc . . . , or for communication over a longer range up to a few hundreds of meters, of the Wi-Fi type.

The non-volatile memory 4 stores a plurality of computer programs, in particular an operating system OS and a plurality of applications. The non-volatile memory 4 also stores data. In FIG. 1, there can be seen three applications A1, A2, and A3, together with data D1, D2, and D3. Naturally, the number of applications and the amount of data may be greater.

The operating system OS serves to control the execution of applications, e.g. in response to a command from the user.

In an embodiment, the operating system OS is a multitasking operating system, which means that a plurality of applications can be executed at the same time. Under such circumstances, one application is executed in the foreground, while at least one other application is executed in the background. The application executed in the foreground is executed in interactive manner, whereas the application(s) executed in the background is/are executed in non-interactive manner. An application that is being executed in interactive manner responds to new commands. For example, the user may input commands for the application via the user interface 5, and the application responds to those commands. In another example, a message received by the communications interface 6 or 7 may contain a command, and the application being executed in the foreground may respond to that command. In contrast, applications being executed in the background do not respond to new commands, whether input by the user or received in messages. In response to a particular commander from the user, the operating system OS may change the application that is being executed in the foreground.

Executing an application may involve accessing resources of the terminal 1, e.g. accessing communications interfaces, and accessing data. For example, the application A1 may be a telephony application and the data D1 may include a list of contacts with telephone numbers. Executing the application A1 involves access to the communications interface 6 and access to the data D1. Similarly, the application A2 may for example be an Internet browser and the data D2 may include data for connection to an Internet site (identifier, password). Execution of the application A2 involves accessing the communications interface 7 and accessing the data D2. Also by way of example, the application A3 may be a contactless payment application and the data D3 may include bank data. Executing the application A3 involves accessing the data D3 and accessing the communications interface 6.

Figure 2:
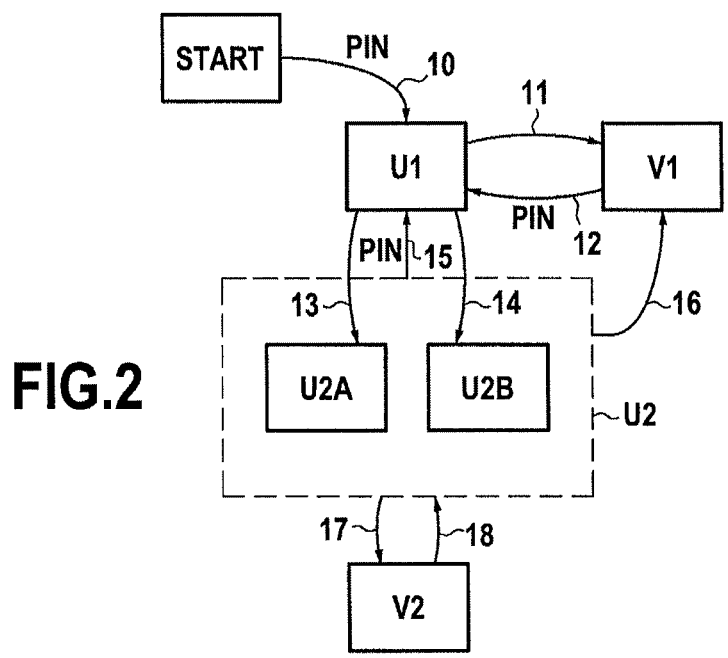
FIG. 2 is a state diagram of the operating system of the FIG. 1 terminal.

FIG. 2 is a state diagram showing the operation of the operating system OS.

The operating system OS presents several states: an initial START state, a normal utilization state U1, a restricted utilization state U2, a locked standby state V1, and a non-locked standby state V2.

After the terminal 1 has started, the operating system OS is in the START state. In this state, the terminal 1 asks the user to input an identification code. By way of example, the identification code is a PIN code, a biometric reading, a touch code, etc. If the user inputs a correct identification code, the operating system moves into the state U1 (arrow 10). For a mobile terminal that is seeking to communicate with a communications network, the identification code may be a code that is predetermined in a secure microcircuit of the terminal, e.g. the PIN code of a SIM card. One of the functions of the PIN code of the SIM card may be unblocking functions that are involved during the stage of authenticating the subscriber with the telecommunications network (executing cryptographic algorithms during authentication, SIM card response, etc. . . . ). Alternatively, or in addition, it may be necessary to input a second identification code stored in a memory of the terminal in order to cause the operating system to change into the U1 state, where this code serves to verify the identity of the proprietor of the telephone.

The normal utilization state U1 enables the user to access all of the resources of the terminal 1, in particular all of the applications A1 to A3 and all of the data D1 to D3. Thus, in response to a command to execute the application A1, as input by the user via the user interface 5, the operating system OS causes the application A1 to be executed with access to the data D1, thereby enabling the user to make a telephone call by using a telephone number from the user's list of contacts. In similar manner, in response to a command to execute the application A2, the operating system OS causes the application A2 to be executed with access to the data D2, thereby enabling the user to access an Internet site with which the user is registered, and without any need to input connection data. In corresponding manner, in response to a command to execute the application A3, the operating system OS causes the application A3 to be executed with access to the data D3, thereby enabling the user to make a contactless payment.

In the state U1, in response to a command to change to standby mode, the operating system OS changes to the locked standby state V1 (arrow 11). By way of example, the command to change into the standby mode may be input by the user (button on the user interface 5) or may be generated by a timer. In this state V1, the operating system OS saves the resources of the terminal 1, e.g. it turns off the screen of the user interface 5 in order to economize battery life. In order to change back into the state U1 from the state V1, the user needs to input a command that includes inputting the user's identification code (arrow 12).

In the state U1, in response to a command for restricted utilization, the operating system OS passes into the restricted utilization state U2 (arrows 13, 14).

In a first embodiment, the state U2 gives access only to certain resources of the terminal 1. More precisely, the operating system OS is configured to execute only some of the applications A1 to A3 and to allow access to only some of the data D1 to D3. With a multitasking operating system OS, the operating system OS is configured to execute in the foreground (i.e. interactively) only some of the applications A1 to A3. In one embodiment, the execution of other applications may nevertheless continue in the background (and thus without it being possible to interact with the user) providing it had already been started in the state U1. In the state U2, the applications that it is possible to execute (or to execute in the foreground with a multitasking operating system) and the data that it is possible to access depend on the restricted utilization command.

For example, if the restricted utilization command specifies that only the application A1 may be executed in the foreground, without access to the data D1 (arrow 13), then the state U2 is a state U2A in which the operating system OS is capable only of executing the application A1 in the foreground, without giving access to the data D1. In the state U2A, it is not possible to trigger execution of the applications A2 and A3. Furthermore, in the event that the applications A2 and A3 are already executing in the background, it is not possible to make them pass into the foreground. Furthermore, the applications A2 and A3 no longer respond to new commands. For example, if the contactless payment application A3 is executing in the background, and the terminal 1 is placed in the proximity of a contactless payment terminal that sends it a message containing a command to validate a payment, the application A3 will not respond.

The state U2A is particularly advantageous when the proprietor of the terminal 1 desires to lend the telephone to some other person solely for the purpose of allowing that person to make a phone call.

In another example, if the restricted utilization command specifies that only the applications A2 and A3 can be executed in the foreground, without access to the data D2 and D3 (arrow 14), then the state U2 is a state U2B in which the operating system can cause only the application A2 or A3 to execute in the foreground, without giving access to the data D2 or D3. In the state U2B it is not possible to trigger execution of the application A1, nor is it possible to bring it into the foreground if it is already executing in the background.

The state U2B is particularly advantageous when the proprietor of the terminal 1 seeks to lend the telephone to another person in order to allow that person to have access to the Internet only.

In a second embodiment, the state U2 allows only some number N of applications to be executed interactively and in succession. The number N is specified in the restricted utilization command.

In both of the above-described embodiments, an access condition is determined by the restricted utilization command for giving access to the restricted utilization mode. In the first embodiment, the access condition defines the applications and the data that it is possible to execute in the foreground. In the second embodiment, the access condition defines the number of successive times execution of applications in the foreground is authorized. Thus, by means of a restricted utilization command, it is possible to limit the utilization of the terminal 1. Furthermore, there is no need to define beforehand the access rights that are available during restricted utilization. On the contrary, in the first embodiment, the applications and the data that are to be accessible are defined on demand, while inputting the restricted utilization command. In the second embodiment, the number N is defined on demand, while inputting the restricted utilization command. The terminal 1 is thus entirely suitable for a situation of being lent, exceptionally, for a short length of time.

In a variant, the restricted utilization command is input in two stages:

firstly, in the state U1, the user causes a list of applications to be displayed. By way of example, in response to a command CMD1, this may be a start menu that enables the user to cause a selected application to be executed. In response to a command CMD2, it may also be a list of applications currently being executed and enabling the user to cause a selected application to be executed in the foreground.

thereafter, the user selects an application from the displayed list and inputs a command CMD3 that is different from the above-mentioned commands CMD1 and CMD2. For example, this may require pressing a hardware button of the user interface 5, selecting a software button by means of the user interface 5, applying a touch command on a touchscreen of the user interface 5, . . . .

In a variant, the command CMD3 comprises inputting the user's identification code.

In response to the command CMD3, the operating system OS changes to the restricted utilization state U2, in which it allows execution (or foreground execution) only of the selected application.

In another variant, the restricted utilization command is input as follows:

firstly, in the state U1, the user causes an application to be executed. The interface for this application includes an element for triggering restricted utilization, e.g. a selectable icon, a software button, a menu element, . . . .

by actuating this element, the application currently being executed sends a request to the operating system OS for changing to the restricted utilization state U2, so as to authorize access to itself only.

Figure 3:
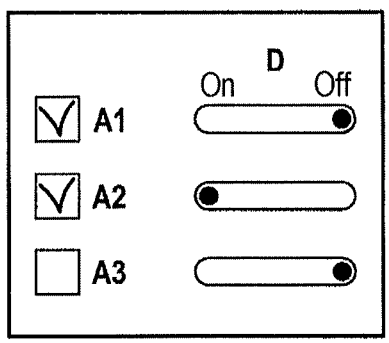
FIG. 3 shows an example of a display enabling a change of state in the FIG. 1 terminal.

In another variant, the user causes a selection menu to be displayed. FIG. 3 shows an example of a selection menu that comprises a list of applications, and for each application, an element for selecting access to that application (in this example a checkbox) together with an element for selecting access to the data associated with the application (in this example an on/off switch). After operating the selection elements to specify the applications and the data that are to be accessible, the user inputs a particular command (e.g. pressing on an "enter" button).

In another variant corresponding to the second above-described embodiment, the user launches a first application AR1 that sends a request to the operating system OS to change to the state U2, while launching the N following applications A2, A3, . . . , that are executed immediately after AR1. N (the number of applications that can be used interactively) is defined when launching the application AR1 by using one of the following methods (in nonlimiting manner):

when AR1 is launched, the interface requests the number of applications that it is to be possible to execute. The user inputs this number by means of the user interface.

multiple requests may be made to execute AR1 without requesting the launching of any other applications between two successive executions of AR1. For example, if the user executes AR1 three times in succession without requesting the launching of any other application, then the user authorizes the next three applications to be used in the state U2.

These commands are particularly simple and quick to input. Switching to restricted utilization state U2 therefore does not require any complex manipulation.

In the above-mentioned situation in which the restricted utilization command is triggered in the state U1, starting from an application that is being executed, the application may be in a state in which it is performing an operation for the user. For example, the application may be connected to one of the user's accounts by making use of connection data, and it may be uploading data to that account. Thus, in an embodiment, in response to the restricted utilization command, the operating system OS stores the state of the application, and then re-initializes the application on changing to the state U2. The person to whom the terminal 1 is lent thus does not have access to the user's account. On changing subsequently to the state U1, the state of the application may be restored by using the stored state.

In a variant, the restricted utilization command comprises not only an indication of access rights concerning applications and data, but also a limit on utilization of a selected application. In the restricted utilization state U2, the operating system OS is configured to cause an application to be executed in compliance with the specified limit. By way of example, this may be a time limit or a limit on the number of operations. By way of example, when lending a telephone to a person seeking to make a phone call, this makes it possible to limit the duration of the call or the number of different calls made.

In the state U2, and in response to a normal utilization command, the operating system OS returns to the normal utilization state U1 (arrow 15). The normal utilization command includes inputting the user's identification code (e.g. a code stored in the memory of the secure microcircuit (e.g. a SIM card) or in the memory of the telephone). Thus, the person to whom the terminal 1 was lent while in the state U2, cannot return to the state U1 and have access to all of the applications and data.

In a variant, while in the state U2, and in response to a command to change to standby mode, the operating system OS changes to the locked standby state V1 (arrow 16). As with arrow 11, the command to change to the standby mode may, for example, be input by the user (button on the user interface 5) or it may be generated by a timer.

In another variant, the operating system OS has a non-locked standby state V2. Thus, in the state U2, and in response to a command to change to standby mode, the operating system OS changes to the NON-locked standby state V2 (arrow 17). Starting from the state V2, it is possible to return to the state U2 (arrow 18) without any need for the identification code.

The two above-described variants may be combined. In other words, under such circumstances, starting from the state U2, the operating system OS may change into the state V1 in response to a first command to change to standby mode, or into the state V2 in response to a second command to change to standby mode, the second command being different from the first.

What is claimed is:

1. A portable computer terminal having an operating system configured to switch from a first state to a second state in response to a first command from a user and to switch from the second state to the first state in response to a second command from the user, the second command including inputting an identification code of the user;

the operating system being configured to, in the first state, cause execution in an interactive manner of applications of a set of applications;

the operating system being configured to, in a second state, cause execution in an interactive manner of an application of said set of applications in compliance with an access condition;

wherein the access condition is determined as a function of said first command; and wherein said access condition defines a maximum number of times the operating system, while in the second state, causes applications to be executed in an interactive manner.

* * * * *